United States Patent [19]

Walley

[11] Patent Number: 4,572,295

[45] Date of Patent: Feb. 25, 1986

[54] METHOD OF SELECTIVE REDUCTION OF THE WATER PERMEABILITY OF SUBTERRANEAN FORMATIONS

[75] Inventor: David Walley, Stillwater, Okla.

[73] Assignee: Exotek, Inc., Stillwater, Okla.

[21] Appl. No.: 639,860

[22] Filed: Aug. 13, 1984

[51] Int. Cl.$^4$ .......................................... E21B 33/138
[52] U.S. Cl. .................................... 166/295; 166/294
[58] Field of Search ................ 166/295, 294; 405/264; 523/130

[56] References Cited

U.S. PATENT DOCUMENTS

| | | | |
|---|---|---|---|
| 3,094,501 | 6/1963 | Wahl et al. | 166/295 X |
| 3,251,414 | 5/1966 | Willman | 166/295 |
| 3,302,717 | 2/1967 | West et al. | 166/295 X |
| 3,418,813 | 12/1968 | Dillon | 405/264 |
| 3,810,468 | 5/1974 | Harper et al. | 128/156 |
| 3,818,998 | 6/1974 | Hessert | 166/294 X |
| 4,059,552 | 11/1977 | Zweigle et al. | 260/29.6 TA |
| 4,155,405 | 5/1979 | Vio et al. | 166/295 |
| 4,163,727 | 8/1979 | Inks | 252/8.55 C |
| 4,172,066 | 10/1979 | Zweigle et al. | 260/29.6 TA |
| 4,182,417 | 1/1980 | McDonald et al. | 166/295 |
| 4,192,727 | 3/1980 | Ward | 204/159.12 |
| 4,199,625 | 4/1980 | Pilny et al. | 427/885.5 |
| 4,225,445 | 9/1980 | Dixon | 252/8.55 C |
| 4,276,935 | 7/1981 | Hessert et al. | 166/295 |
| 4,282,928 | 8/1981 | McDonald | 166/295 X |
| 4,332,297 | 6/1982 | Sandiford | 166/270 |

OTHER PUBLICATIONS

Weaver et al., A Practical Process for the Preparation of Super Slurper, a Starch-Based Polymer with a Large Capacity to Absorb Water. Die Starke V. 29, No. 12, pp. 413–422, 1977.

Primary Examiner—George A. Suchfield
Attorney, Agent, or Firm—Dunlap, Codding & Peterson

[57] ABSTRACT

The water permeability of a subterranean formation is selectively reduced by introducing a non-aqueous treatment agent into the formation. The treatment agent comprises a hydrogel polymer and a non-aqueous fluid carrier. The treatment agent preferably further comprises an alkali metal carbonate when calcium-rich aqueous brines are resident in the formation. The treatment agent is maintained within the formation for a time sufficient to permit the hydrogel polymer to absorb water from the formation. As it contacts water, the hydrogel polymer swells and thereby blocks further water flow through formation pores. Treatment of formations in accordance with this method permits enhanced recovery of minerals, such as hydrocarbons, by selective reduction of water flow into producing wells or shafts.

18 Claims, No Drawings

METHOD OF SELECTIVE REDUCTION OF THE WATER PERMEABILITY OF SUBTERRANEAN FORMATIONS

FIELD OF THE INVENTION

The present invention relates generally to methods for the selective reduction of water permeability of water-containing subterranean formations, and more particularly to the use of such methods for enhancing the recovery of minerals.

SUMMARY OF THE INVENTION

The water permeability of a subterranean formation is selectively reduced by introducing a non-aqueous treatment agent into the formation. The treatment agent, which comprises a hydrogel polymer, is maintained within the formation for a time sufficient to permit absorption of water within the formation by the hydrogel polymer. The method may be used to enhance the recovery of minerals from such a formation.

DETAILED DESCRIPTION OF THE PREFERRED EMBODIMENTS

Permeable subterranean formations often contain water, in many instances in the form of aqueous brines. Because this water is capable of flowing through the formation under appropriate conditions, its presence can sometimes interfere with other activities being carried on within the formation. For example, during recovery of minerals, such as hydrocarbons, through a shaft or well drilled into a formation, water may flow from the formation into the well, thereby reducing mineral production. Excessive water flow may render mineral production uneconomical, or may reduce reservoir pressure to such an extent that mineral recovery is not possible.

The present invention is directed to a method of selectively reducing the water permeability of a subterranean formation. Because the method is selective, it may be used with advantage to enhance the recovery of minerals from such a formation: the flow of water into a shaft or well may be selectively reduced, without corresponding reduction of the flow of minerals into the well. Use of the method thereby permits more efficient mineral recovery operations.

In accordance with the present invention, a nonaqueous treatment agent is introduced into that portion of a subterranean formation in which water permeability is to be reduced selectively. In instances in which the water permeability of that portion of a formation adjacent a shaft or well is to be reduced, the treatment agent preferably is a fluid and preferably is introduced into the formation under pressure through the shaft or well by conventional injection techniques.

The non-aqueous treatment agent comprises a hydrogel polymer, which preferably is suspended in a non-aqueous fluid carrier. The fluid carrier is preferably an aliphatic or aromatic petroleum derivative or an alcohol of low molecular weight, and may comprise a fluid such as gasoline or low viscosity diesel fuel, toluene, or methanol. Preferably, the ratio of hydrogel polymer to fluid carrier is in the range of between about 0.1 g/liter and about 50 g/liter. When the treated formation is characterized by extremely fine pore zones, such as those with pore sizes in the 5 micron range, a concentration in the range of between about 0.1 g/liter and about 0.9 g/liter is preferred. If the treatment agent is to be used to treat formations characterized by large cracks or voids, such as those produced by explosives or acid fracturing, then a concentration in the range of between 50 g/liter and about 2 kg/liter is preferred.

When it is contemplated that the treatment agent of the present invention is to penetrate more deeply into a formation than about 5 feet from the point of introduction, the fluid carrier should be selected with reference to the contact angle of the formation. Since the fluid carrier should not wet the formation, the critical surface tension of the fluid carrier should be greater than the average critical surface tension of the treated formation. Thus, if the treated formation is water wet, non-polar compounds, such as aliphatic or aromatic hydrocarbons, should be used as the fluid carrier. On the other hand, if the treated formation is oil wet, a more polar fluid carrier, such as methanol, should be used.

If necessary to bring the critical surface tension of the fluid carrier into the required relationship with the critical surface tension of the treated formation, a surfactant may be added to the treatment agent of the present invention. Suitable surfactants include aliphatic and aromatic quaternary ammonium compounds such as N-decyl trimethyl ammonium chloride and 7(pentafluoro-propyl) heptane trimethyl ammonium chloride.

The hydrogel polymer used in the treatment agent comprises a polymer or copolymer which will swell or absorb water when contacted by water-containing solutions of the type which exist in the formation to be treated in accordance with the method of the present invention. Since water in many subterranean formations exists in the form of aqueous brines, a hydrogel polymer used to treat such a formation must swell in response to aqueous solutions of group IA or IIA metals (as applicable) and having a pH comparable to that of the formation brine.

Hydrogel polymers which are acceptable for practice of the method of the present invention under many subterranean conditions include copolymers of acrylamide or substituted acrylamides and acrylic acid, or alkali metal or ammonium salts of acrylic acid. These copolymers preferably are cross-linked lightly. One means of cross-linking, described in U.S. Pat. No. 3,810,468, involves chemical cross-linking with a monomer such as glyoxal or methylenebisacrylamide. A more preferred form of cross-linking involves subjecting a monomer mixture to a controlled dose of ionizing radiation, which produces a cross-linking bond which is more stable than chemical cross-links to hydrolysis under pH conditions prevailing in subterranean formations.

Although acrylate-acrylamide copolymers of the type just described comprise one of the more preferred hydrogel polymers for practice of the present invention, other acceptable hydrogel polymers include polymers or copolymers of vinyl morpholinone, vinyl sulfonic acid, and ammonium and alkali metal salts thereof. Also acceptable are polymers or copolymers of acrolein, sulfur dioxide and allyl alcohol, alkyl ether of glycerol, allyl ether of ethylene glycol, and polyethylene glycol. The hydrogel polymer of the present invention may also comprise a copolymer of starch, modified starch, cellulose, Guar gum, or Xanthan gum. Other acceptable hydrogel polymers include polymers and copolymers such as poly(ethylene imine), polyethylene sulfonate, polystyrene sulfonate, and cation absorbents such as triallylmethylammonium chloride, bisdiallyl ammonium salts, tetraallylpiperazinium chloride, and N'N'N'N'-tetraallyl-N'N' dimethyl hexamethylenediammonium chloride. The hydrogel of the present invention may also comprise polymers and copolymers of ethylene oxide, propylyene oxide, or cross-linked derivatives thereof.

In general, preferred copolymers for practice of the present invention comprise the reaction products of ethylenically unsaturated carboxylic acids and ethylenially unsaturated amides. Preferably, the carboxylate and amide units are distributed randomly throughout the resulting copolymer. The ratio of acrylate to amide units should be between about 0.15 and about 20, with lower ratios preferable for firmer gels, and higher ratios preferred for gels having higher fluid capacities. The degree of cross-linking should be selected in accordance with the strength and fluid capacity requirements of the hydrogel. When the copolymer comprises an acrylate-acrylamide copolymer its molecular weight is preferably between about 500 and 4,000,000, and preferably between about 1,000 and about 500,000.

Another preferred hydrogel for practice of the present invention comprises a starch-polyester copolymer prepared by copolymerization of a reaction mixture comprising a concentrated aqueous emulsion of starch and polyester resin. The starch and polyester resin preferably make up between about 1 and about 20 weight percent of the aqueous emulsion. The ratio of starch to polyester resin in the emulsion is preferably between about 1 and about 2.

Copolymerization of the starch-polyester reaction mixture preferably is carried out by adding a free radical initiator, such as an acidified ceric ammonium nitrate solution, to the reaction mixture. Once copolymerization is complete, the reaction mixture is subjected to basic hydrolysis, preferably by treatment with an alkali metal hydroxide, to convert carboxylic acid groups to more soluble carboxylate groups. Drying and water separation results in production of a hydrogel polymer suitable for use in the method of the present invention.

The hydrogel polymer used in the treatment agent preferably is characterized by a particulate state and most preferably is cuboidal or acicular in shape, with an aspect ratio (L/D) of between about 1 and about 10. The hydrogel polymer preferably comprises and consists essentially of nonspheroidal particles. A non-uniform and non-spheroidal particle geometry is preferred, since particles having such geometry may be trapped more readily in a formation and are less likely to roll out of pore space in the formation.

The average particle diameter of the hydrogel preferably is selected with reference to the average pore diameter and crack and void distribution in the formation to be treated in accordance with the method of the present invention. Preferably, a substantial fraction of the hydrogel polymer particles is characterized by an average diameter less than the average pore diameter of the treated formation, and greater than about ¼ of the average pore diameter. Selection of the average particle size within the described range assures that particles of hydrogel polymer can become lodged in formation pores, and that these pores will be blocked to water migration once the hydrogel polymer particles become swollen with water.

Another fraction of the hydrogel polymer particles may be characterized by an average particle diameter of at between about one and about two orders of magnitude greater than the average permeable pore diameter of the treated formation. In a typical formation, this fraction should be characterized by particle diameter between about 500 microns and about 5 mm. Hydrogel particles in this coarse fraction, when swollen, can plug large formation cracks and voids which result from well perforation conducted with explosive charges, or from sand fracturing operations conducted in the formation.

When a formation containing large cracks or voids is to be treated in accordance with the present invention, the hydrogel polymer component of the treatment agent may consist predominantly or even entirely of a coarse fraction of the type described above. In this event, the fluid carrier with which the hydrogel polymer is mixed may be thickened, if necessary, so that the treatment agent comprises a stable, pumpable slurry. Suitable thickening agents for non-polar fluid carriers include high molecular weight polyisobutylenes, styrene-butadiene copolymers, aliphatic carboxylates, such as ammonium stearate, napalm and mixtures of acetylsalicylic acid and polymeric proteins. Suitable thickening agents for more polar fluid carriers include high to medium molecular weight ethylene oxide copolymers and their derivatives, such as polyethylene glycol, acrylamides, and their cationic derivatives. Other suitable thickening agents include ethyoxylated silicones such as Silwet ® L-7000, a surface active copolymer manufactured by Union Carbide Corporation.

The preferred cuboidal or acicular shape and the preferred particle diameter for the hydrogel polymer preferably are produced by shearing the polymer while it is water-loaded and then dehydrating the polymer and pulverizing it by a particle sizing technique such as a ball mill or jet pulverizing.

The gelling ratio of the hydrogel polymer is the weight of water which may be absorbed per unit weight of dry hydrogel polymer. In the present invention, it is preferred that the hydrogel polymer have a gelling ratio of at least about 10, and preferably between about 10 and about 200.

In some instances, subterranean aqueous brines may have a high calcium ion concentration, which tends to inhibit the asorption of water by the hydrogel polymer. In this event, the treatment agent preferably further comprises an additive comprising alkali metal carbonate such as sodium or potassium carbonate. The weight ratio of alkali metal carbonate to dry hydrogel polymer is preferably between about 25% and about 50%. Alkali metal ions in the treatment agent cause precipitation of calcium as the brine contacts the treatment agent; removal of calcium from solution enhances the gelling ratio of the hydrogel polymer, and produces a precipitate which enhances plugging of formation pores.

The treatment agent of the present invention may further comprise one or more wellbore scale inhibitors, including polycarboxylate chelating agents such as trisodium nitrilotriacetate and tetrasodium EDTA. These inhibitors act to inhibit scale buildup adjacent pipe perforations through which the treatment agent is introduced into a formation. The treatment agent may further comprise inert diluents and weighting agents such as fracturing sand and barium compounds, which assist in placement of the hydrogel polymer within voids in the treated formation.

Once introduced into a subterranean formation, the treatment agent is maintained within the formation for a time sufficient to permit the hydrogel polymer to absorb water from the formation. When the treatment agent is introduced into the formation through a shaft or well, this step preferably is carried out by shutting in the well while the treatment agent seeps into the formation. Preferably, the treatment agent is maintained within the formation for between about 12 hours and about 60 days.

The water may flow naturally into the treated portion of the formation or it may be drawn into the treated portion of the formation by reduced pressure maintained within a shaft or well drilled into the formation. In one mode of the present invention, the carrier fluid of the treatment agent is withdrawn from the treated portions of the formation and into the shaft by pumping, causing water to flow into treated portions of the formation previously occupied by the carrier fluid. As water enters this treated portion of the formation and the crack, void and sand propped space therein, the water causes the hydrogel polymer to swell; this swelling blocks the formation pores to further water flow.

Swelling of hydrogel polymer reduces the water porosity of the formation, and fills the crack, void and sand propped space therein, particularly in that portion of the formation adjacent a shaft or well through which the treatment agent has been introduced. In those areas of a formation in which water is not present, such as mineral-containing portions of the formation, the treatment agent does not become swollen, and allows relatively free flow of minerals. Thus, by selective reduction of water porosity of those portions of a formation characterized by water flow, mineral production from the mineral-bearing portions of the formation may be enhanced.

Because the treatment agent is non-aqueous, it is contemplated that swelling of the hydrogel polymer will typically occur within the treated formation, and the crack, void and sand propped space therein, and not in the shaft or well through which the treatment agent is introduced. If, however, premature swelling of the hydrogel should occur, either because of the presence of water within the shaft or well, or because of a high water content within the treated formation, it is possible that the swollen hydrogel polymer could block the wellbore or the formation. In this event, a solution of a halogen-generating oxidizing agent, such as sodium hypochlorite, may be injected at the blockage site. The halogen generated in situ by this procedure can break the polymer structure and reduce the viscosity of the gel, permitting the blockage to be broken up.

The following examples illustrate the methods and compositions of the present invention.

EXAMPLE 1

A hydrogel polymer was prepared by first adding 15 g of Argo brand processed corn starch to 150 ml distilled water. This mixture was heated at 150° F. on a steam bath until the starch gelled in the water. The gelled mixture was permitted to cool to 72° F., and 10 g Duro brand polyester resin, a high molecular weight (500–30,000) reaction product of aliphatic or aromatic carboxylic acids with alkyl or aryl polyalcohols, was mixed with the starch and stirred until a homogeneous emulsion was produced.

A free radical iniating solution was prepared by adding 0.3 g ceric ammonium nitrate to 30 ml 0.1-N nitric acid. This solution was added to the starch-polyester emulsion and the mixture was heated at 150° F. for 30 minutes. As copolymerization took place, the viscosity of the solution increased steadily.

After one hour, the mixture was cooled and neutralized with 0.1 N potassium hydroxide until the pH of the mixture was 7. The neutralized mixture then was immersed in 300 ml denatured ethanol chloroform solution in order to remove unreacted polyester resin. The copolymer then was dried; its weight was 22 g.

The 22 g of copolymer next was added to 150 ml distilled water and the mixture was heated to 150° F. The copolymer was hydrolyzed by dropwise addition of 0.1-N potassium hydroxide to the solution over the next hour. The mixture then was washed with 200 ml ethanol in order to remove remaining water; and the copolymer then was dried for 3 hours at 150° F.

EXAMPLE 2

A number of 1 gram samples of each of three kinds of hydrogel polymers were separately treated with various aqueous fluids to produce hydrated gel samples. A sodium carbonate additive was added to some of the dry hydrogel samples prior to fluid treatment. The dry hydrogel polymers used were: Viterra, the potassium salt of an acrylateacrylamide copolymer, marketed by Schering Corp.; Agrigell, the potassium salt of a starch-acrylonitrile copolymer, marketed by Super Absorbent Co., Inc.; and the starch-polyester copolymer prepared in accordance with Example 1.

The dry hydrogel samples were mixed with the following fluids and additives: (1) oilfield brine (calcium-rich brine obtained from the Bartlesville formation in the Oklahoma City, Okla. area), 46 ml; or (2) oilfield brine, 68 ml, sodium carbonate, 0.25 g; or (3) oilfield brine, 86 ml, sodium carbonate, 1.0 g; or (4) tap water, 600 ml; or (5) tap water, 520 ml sodium carbonate, 0.25 g; or (6) tap water, 400 ml sodium carbonate, 1.0 g. In samples containing 0.25 g sodium carbonate, the sodium carbonate totalled 20% of the solid weight of the sample (sodium carbonate weight plus dry hydrogel weight). In samples containing 1.0 g sodium carbonate, the sodium carbonate totalled 50% of the solid weight of the sample (sodium carbonate weight plus dry hydrogel weight).

After a few hours, the weight of each hydrated gel sample was measured by triple beam balance, and the gelling ratio (grams water absorbed/grams dry hydrogel) was calculated. The results of these measurements are shown in Table I.

TABLE I

| Hydrogel Polymer | Additive (% of total solid weight) | Fluid | Gelling Ratio |
|---|---|---|---|
| acrylate-acrylamide | none | tap water | 500 |
| acrylate-acrylamide | 20% $Na_2CO_3$ | tap water | 450 |
| acrylate-acrylamide | 50% $Na_2CO_3$ | tap water | 300 |
| acrylate-acrylamide | none | oilfield brine | 50 |
| acrylate-acrylamide | 20% $Na_2CO_3$ | oilfield brine | 75 |
| acrylate-acrylamide | 50% $Na_2CO_3$ | oilfield brine | 95 |
| starch-acrylonitrile | none | tap water | 600 |
| starch-acrylonitrile | 20% $Na_2CO_3$ | tap water | 520 |
| starch-acrylonitrile | 50% $Na_2CO_3$ | tap water | 400 |
| starch-acrylonitrile | none | oilfield brine | 9 |
| starch-acrylonitrile | 20% $Na_2CO_3$ | oilfield brine | 18 |
| starch-acrylonitrile | 50% $Na_2CO_3$ | oilfield brine | 54 |
| starch-polyester | none | tap water | 10 |
| starch-polyester | 20% $Na_2CO_3$ | tap water | 9 |
| starch-polyester | none | oilfield brine | 25 |
| starch-polyester | 20% $Na_2CO_3$ | oilfield brine | 35 |

EXAMPLE 3

An oil well located in Okfuskee County, Okla., with a depth in excess of 5,000 feet, produced 5 barrels of oil and 280 barrels of water per day. A core sample taken from the well was examined microscopically, and the producing formation was determined to have an average permeable pore size of 500 microns.

100 pounds of 20 mesh Agrisoak, an acrylic acid-acrylamide copolymer marketed by Super Absorbent Co., Inc., was ground in a ball mill for 2 hours, 45 minutes to produce an average particle diameter of 100 microns. The 100 pounds of copolymer was mixed with 1000 gallons of diesel fuel and the mixture was injected into the formation. The well then was shut in for 3 days. When the well was reopened, it produced 15 barrels of oil and 120 barrels of water per day.

EXAMPLE 4

A gas well located near Oklahoma City, Okla., with a depth in excess of 3,000 feet, was reported to have water production problems. The well produced 120 barrels of water per day, with little or no show of gas. 125 pounds of 20 mesh Agrisoak, a cross-linked, acrylic acid-acrylamide copolymer marketed by Super Absorbent Co., Inc., were mixed with 1000 gallons of diesel fuel to produce a treatment agent, which was injected into the producing formation. The well then was shut in for 60 days. When the well was opened, it produced 0.2 MMCFD gas with no water. Six months later, the well producedo 0.1 MMCFD gas, with no water.

EXAMPLE 5

An oil well located near Muskogee, Okla., with a depth of 1,470 feet, produced 1 barrel of oil and 125 barrels of water per day. 100 pounds of 20 mesh Agrisoak were mixed with 1000 gallons of diesel fuel and the mixture was injected into the formation. A pad of well brine water was injected into the wellhead in order to force the mixture into the formation. A pressure increase from 800 p.s.i. to 3000 p.s.i. was observed after injection; this increase indicated some type of blockage in the wellbore. The well was shut in overnight, and allowed to flow back the next morning.

After the well was reopened, the volume of fluids produced from the well dropped steadily over the next week, until little or no flow was observed. 1000 gallons of 5% aqueous solution of sodium hypochlorite were injected into the formation, and the well was shut in for one hour. When pumping was resumed, the well resumed producing fluids at its original volume rate. Investigation later revealed that a 40 foot column of fracturing sand had been left in the casing prior to the injection of the treatment agent.

EXAMPLE 6

The following is a preferred formulation of treatment agent for use in treating a large crack distribution in an acid-fractured limestone formation:

| | |
|---|---|
| Radiation cross-linked acrylic acid - acrylamide copolymer, 20 mesh | 350 lbs. |
| Radiation cross-linked acrylic acid - acrylamide copolymer, ⅛" coarse | 50 lbs. |
| Sodalite, manufactured by Stauffer Chemical Co. | 150 lbs. |
| Trisodium nitrilotriacetate | 50 lbs. |
| Diesel fuel | 500 gal. |
| 3-component diesel gel, manufactured by Nalco Chemical Co.: | |
| Nalco Bi-11 | 1 gal. |
| Nalco Asp-162 | 6–8 gal. |
| Nalco 2 | 2 gal. |
| Mark 2 Diesel gel breaker manufactured by Atomite | 10 lbs. |

Changes may be made in the construction, operation and arrangement of the various parts, elements, steps and procedures described herein without departing from the spirit and scope of the invention as defined in the following claims.

What is claimed is:

1. A method of selectively reducing the water permeability of a subterranean formation comprising:
   introducing a non-aqueous treatment agent, comprising a cross-liked hydrogel polymer, into the formation, the hydrogel polymer comprising:
   a first particle fraction comprising: particles having an average diameter less than the average pore diameter of the treated formation and greater than about ¼ of the average pore diameter of the treated formation; and
   a second particle fraction comprising: particles having an average diameter of between about one and about two orders of magnitude greater than the average pore diameter of the treated formation; and
   maintaining the treatment agent within the formation for a time sufficient to permit the hydrogel polymer to absorb water from the formation.

2. The method of claim 1 in which the hydrogel polymer is characterized by a gelling ratio of at least about 10.

3. The method of claim 1 in which the hydrogel polymer comprises particles having a cuboidal or acicular shape.

4. The method of claim 3 in which the hydrogel polymer comprises particles having an aspect ratio of between about 1 and about 10.

5. The method of claim 1 in which the treatment agent further comprises a fluid carrier.

6. The method of claim 5 in which the fluid carrier comprises a petroleum derivative.

7. The method of claim 5 in which the treatment agent comprises between about 0.1 grams and about 2 kilograms hydrogel polymer per liter of fluid carrier.

8. The method of claim 1 in which the treatment agent further comprises an alkali metal carbonate.

9. The method of claim 1 in which the treatment agent is maintained within the formation for between about 12 hours and about 60 days.

10. A method of enhancing the recovery of minerals from a subterranean formation comprising:
    introducing a non-aqueous treatment agent, comprising a cross-linked hydrogel polymer, into the formation, the hydrogel polymer comprising:
    a first particle fraction comprising: particles having an average diameter less than the average pore diameter of the treated formation and greater than about ¼ of the average pore diameter of the treated formation; and
    a second particle fraction comprising: particles having an average diameter of between about one and about two orders of magnitude greater than the average pore diameter of the treated formation; and maintaining the treatment agent within the formation for a time sufficient to permit the hydrogel polymer to absorb water from the formation.

11. The method of claim 10 in which the hydrogel polymer is characterized by a gelling ratio of at least about 10.

12. The method of claim 10 in which the hydrogel polymer comprises particles having cuboidal or acicular shape.

13. The method of claim 12 in which the hydrogel polymer comprises particles having an aspect ratio of between about 1 and about 10.

14. The method of claim 10 in which the treatment agent further comprises a fluid carrier.

15. The method of claim 14 in which the fluid carrier comprises a petroleum derivative.

16. The method of claim 14 in which the treatment agent comprises between about 0.1 grams and about 2 kilograms hydrogel polymer per liter of fluid carrier.

17. The method of claim 10 in which the treatment further comprises an alkali metal carbonate.

18. The method of claim 10 in which the treatment agent is maintained within the formation for between about 12 hours and about 60 days.

* * * * *